(12) United States Patent
Rogers

(10) Patent No.: US 8,904,654 B2
(45) Date of Patent: Dec. 9, 2014

(54) VEHICLE WHEEL ALIGNMENT SYSTEM AND METHODOLOGY

(71) Applicant: Snap-On Incorporated, Kenosha, WI (US)

(72) Inventor: Steven W. Rogers, Conway, AR (US)

(73) Assignee: Snap-On Incorporated, Kenosha, WI (US)

( * ) Notice: Subject to any disclaimer, the term of this patent is extended or adjusted under 35 U.S.C. 154(b) by 0 days.

(21) Appl. No.: 14/033,277

(22) Filed: Sep. 20, 2013

(65) Prior Publication Data

US 2014/0023238 A1    Jan. 23, 2014

Related U.S. Application Data

(63) Continuation of application No. 13/078,472, filed on Apr. 1, 2011, now Pat. No. 8,539,684, which is a continuation of application No. 12/731,751, filed on Mar. 25, 2010, now Pat. No. 7,937,844, which is a continuation of application No. 12/258,942, filed on Oct. 27, 2008, now Pat. No. 7,703,213, which is a continuation of application No. 11/987,606, filed on Dec. 3, 2007, now Pat. No. 7,458,165, which is a continuation of application No. 11/487,964, filed on Jul. 18, 2006, now Pat. No. 7,313,869.

(51) Int. Cl.
*G01B 7/30* (2006.01)
*G01B 11/26* (2006.01)
*G01B 11/275* (2006.01)
*G06K 9/00* (2006.01)

(52) U.S. Cl.
CPC ........ *G06K 9/00791* (2013.01); *G01B 11/2755* (2013.01); *G01B 2210/30* (2013.01); *G01B 2210/28* (2013.01)

USPC .................................................. 33/203.18

(58) Field of Classification Search
USPC .................... 33/203, 203.18, 203.19, 288
See application file for complete search history.

(56) References Cited

U.S. PATENT DOCUMENTS 5,056,233 A * 10/1991 Hechel et al. ............... 33/288
5,531,030 A *  7/1996 Dale, Jr. ..................... 33/203

(Continued)

FOREIGN PATENT DOCUMENTS

WO    94/05969 A1    3/1994
WO    2009/015021 A1    1/2009

(Continued)

OTHER PUBLICATIONS

European Office Communication Pursuant to Article 94(3) issued in European Application No. 07 861 340.3 dated Dec. 19, 2013.

*Primary Examiner* — G. Bradley Bennett
(74) *Attorney, Agent, or Firm* — McDermott Will & Emery LLP

(57) ABSTRACT

A hybrid wheel alignment system and methodology use passive targets for a first pair of wheels (e.g. front wheels) and active sensing heads for another pair of wheels (e.g. rear wheels). The active sensing heads combine image sensors for capturing images of the targets with at least one spatial relationship sensor for sensing a relationship between the active sensing heads. One or both of the active sensing heads may include inclinometers or the like, for sensing one or more tilt angles of the respective sensing head. Data from the active sensing heads may be sent to a host computer for processing to derive one or more vehicle measurements, for example, for measurement of parameters useful in wheel alignment applications.

15 Claims, 13 Drawing Sheets

(56) References Cited

U.S. PATENT DOCUMENTS

| | | | |
|---|---|---|---|
| 5,636,016 A * | 6/1997 | Coetsier et al. | 33/203.18 |
| 5,724,743 A * | 3/1998 | Jackson | 33/288 |
| 5,886,781 A | 3/1999 | Muller et al. | |
| 7,313,869 B1 * | 1/2008 | Rogers | 33/203.18 |
| 7,458,165 B2 * | 12/2008 | Rogers | 33/203.18 |
| 7,937,844 B2 * | 5/2011 | Rogers | 33/203.18 |
| 2002/0080343 A1 * | 6/2002 | Bux et al. | 356/139.09 |
| 2004/0244463 A1 * | 12/2004 | Dale, Jr. | 73/1.75 |
| 2006/0090356 A1 * | 5/2006 | Stieff | 33/288 |
| 2006/0283027 A1 * | 12/2006 | Bryan | 33/203.18 |

FOREIGN PATENT DOCUMENTS

| WO | 2009/017492 A1 | 2/2009 |
|---|---|---|
| WO | 2009/017493 A1 | 2/2009 |
| WO | 2009/018523 A1 | 2/2009 |

\* cited by examiner

VEHICLE WHEEL ALIGNMENT SYSTEM AND METHODOLOGY

RELATED APPLICATIONS

This application is a Continuation of U.S. application Ser. No. 13/078,472, filed on Apr. 1, 2011, which is a Continuation of U.S. application Ser. No. 12/731,751, filed Mar. 25, 2010, now U.S. Pat. No. 7,937,844, which is a Continuation of U.S. application Ser. No. 12/258,942, filed Oct. 27, 2008, now U.S. Pat. No. 7,703,213, which is a Continuation of U.S. application Ser. No. 11/987,606, filed Dec. 3, 2007, now U.S. Pat. No. 7,458,165, which is a Continuation of U.S. application Ser. No. 11/487,964, filed Jul. 28, 2006, now U.S. Pat. No. 7,313,869, the entire contents of each of which are hereby incorporated by reference.

TECHNICAL FIELD

The present subject matter relates to techniques and equipment for vehicle wheel alignment utilizing a combination of image-processing based alignment technologies and one or more other alignment technologies.

BACKGROUND

A current conventional vehicle wheel alignment system uses sensors or heads that are attached to the wheels of a vehicle to measure various angles of the wheels and suspension. These angles are communicated to a host system, where they are used in the calculation of vehicle alignment angles. In the standard conventional aligner configuration, four alignment heads are attached to the wheels of a vehicle. Each sensor head comprises two horizontal or toe measurement sensors and two vertical or camber/pitch sensors. Each sensor head also contains electronics to support overall sensor data acquisition as well as communications with the aligner console, local user input, and local display for status feedback, diagnostics and calibration support. The four sensors and electronics as well as the mechanical housing that makes up each head necessarily is duplicated four times, as there is one for each wheel.

In recent years, wheels of motor vehicles have been aligned in some shops using a computer-aided, three-dimensional (3D) machine vision alignment system. In such a system, one or more cameras view targets attached to the wheels of the vehicle, and a computer in the alignment system analyzes the images of the targets to determine wheel position and alignment of the vehicle wheels from the wheel position data. The computer typically guides an operator to properly adjust the wheels for precise alignment, based on calculations obtained from processing of the image data. A wheel alignment system or aligner of this image processing type is sometimes called a "3D aligner." An example of a vehicle wheel aligner using such image processing is the Visualiner 3D or "V3D", commercially available from John Bean Company, Conway, Ark., a division of Snap-on Incorporated.

Conventional non-vision alignment systems, with sensors mounted directly on the vehicle wheels, are becoming commodity items. The market price point for conventional systems has continued to drop due to competition and wider acceptance of image processing type, non-wheel mounted sensor, alignment systems. Main stream conventional alignment systems continue to require high accuracy and established features sets, yet lower cost technology and manufacturing processes are preferred. Unfortunately, these advances may still achieve only an incremental cost improvement.

Desired are systems using wheel-mounted sensor heads of a new paradigm that reduces cost but maintains accuracy and features.

SUMMARY

The teachings herein improve over conventional alignment systems by combining image processing aligner type targets for one or more of the heads with camera imaging equipment and position/orientation sensors in other wheel heads.

For example, a wheel alignment system may include a pair of passive heads and a pair of active sensing heads. The passive heads are adapted for mounting in association with a first pair of wheels of a vehicle that is to be measured by operation of the wheel alignment system. The active sensing heads are adapted for mounting in association with a second pair of wheels of the vehicle. Each of the passive heads includes a target, e.g. as may be observed by an image sensor. Each active sensing head includes an image sensor for producing image data, which is expected to include an image of a passive target when the various heads are mounted on or in association with the respective wheels of the vehicle. The system also includes at least one sensor module associated with one of the active sensing heads. The sensor module is used to determine a spatial relationship between the active sensing heads, when the active sensing heads are mounted on wheels of the vehicle. The system also includes a processor. The processor processes image data relating to observation of the targets as well as relationship data from the sensor module. The data processing enables computation of at least one measurement of the vehicle.

In accord with another aspect of the disclosure, a sensing head for use in a wheel alignment system includes a housing for mounting on a wheel of a vehicle that is to be measured by operation of the wheel alignment system and an image sensor mounted to the housing. The image sensor produces image data. In a measurement operation, the image data typically includes an image of a target in association with another wheel of the vehicle. The sensing head also includes at least one tilt sensor mounted to the housing for sensing a tilt angle of the active sensing head when the active sensing head is mounted on a wheel of the vehicle. A processor is responsive to the image data, the sensed tilt angle and a relationship to another had mounted on the vehicle. A communication interface coupled to the processor allows transmission of wheel alignment measurement data, from the active sensing head to a user device of the wheel alignment system.

A method of taking at least one measurement of a vehicle in accord with principles taught herein involves capturing an image of a target associated with a first wheel of the vehicle with an image sensor in a first head mounted in association with a second wheel of the vehicle, to produce first image data. An image of a target associated with a third wheel of the vehicle is captured with an image sensor in a second head mounted in association with a fourth wheel of the vehicle, to produce second image data. The method further entails measuring relationships of the first and second heads relative to at least one reference. The first and second image data and the reference relationship measurements are processed to compute at least one measurement of the vehicle.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of the methodologies, instrumentalities and combinations particularly pointed out in the appended claims.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and circuitry have been described at a relatively high-level, without detail, in order to avoid unnecessarily obscuring aspects of the present teachings.

The examples shown in the various drawings provide relatively low cost alignment systems. The exemplary systems are "hybrid" in nature in that they combine aspects of image processing with one or more other types of measurement technologies. Such a hybrid system uses visible targets, e.g. on passive heads, for two wheels of a vehicle under test, and the system uses a combination of optical imaging sensors (e.g. cameras) and other alignment sensors in active sensing heads that attach to two other wheels of the vehicle. The passive heads are substantially cheaper to manufacture than heads used in conventional alignment systems. The cost of the active sensing heads may be generally comparable to the cost of two heads of a conventional wheel alignment system.

Measuring the position and orientation of the front wheels of the vehicle using imaging technology offers additional advantages, including the ability to derive measurements associated with image processing based wheel alignment that are not normally available in a low cost system. These additional measurements may include scrub radius, (U.S. Pat. No. 6,532,062), roll radius (U.S. Pat. No. 6,237,234), and caster trail (U.S. Pat. No. 6,661,751).

Reference now is made in detail to the examples illustrated in the accompanying drawings and discussed below.

Figure 1:
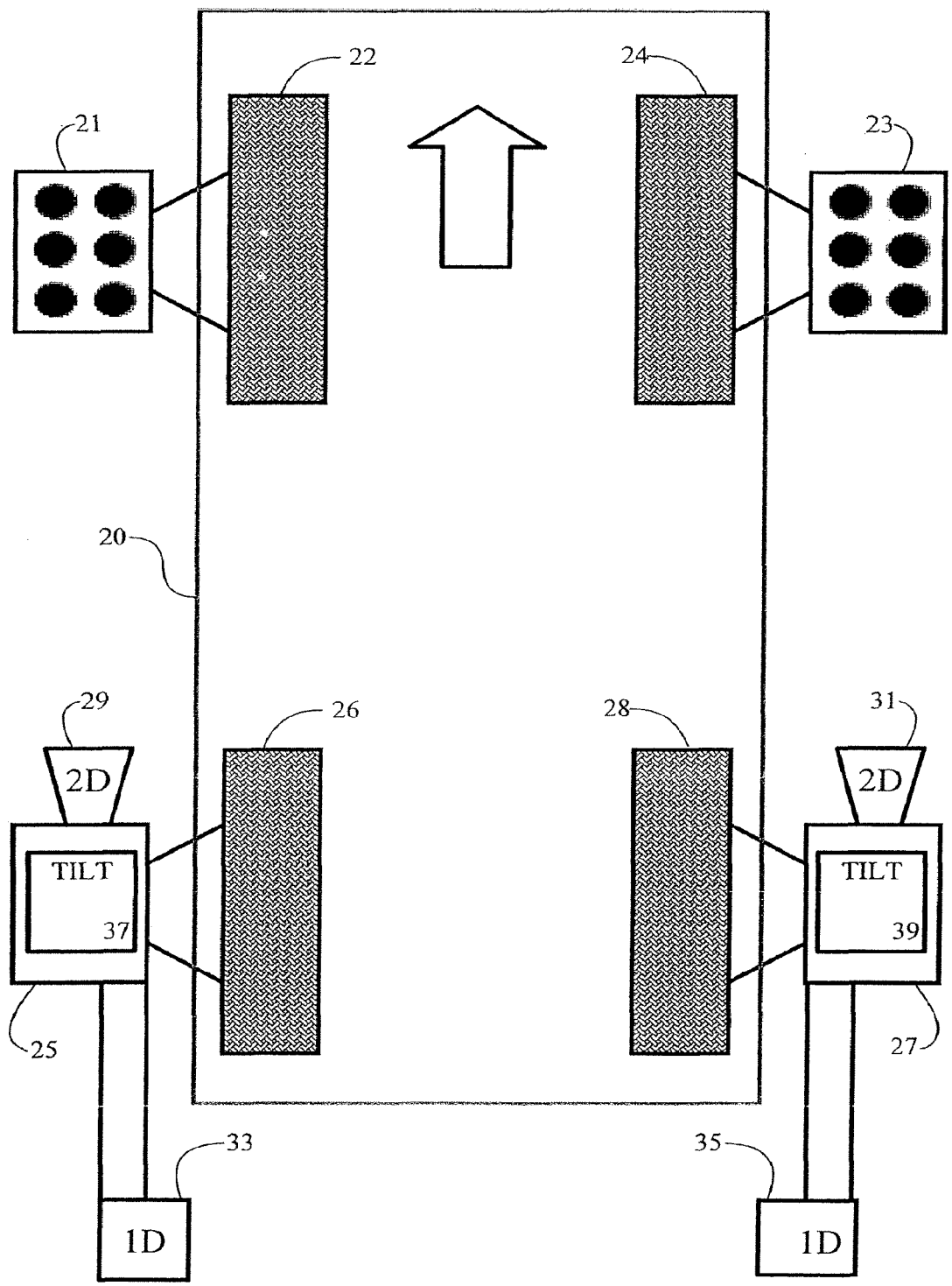
FIG. 1 diagrammatically illustrates a first arrangement of targets and active sensing heads in relation to vehicle wheels.

FIG. 1 depicts a first arrangement of targets and active sensing heads in relation to wheels of a vehicle 20 that is under test, e.g. to measure one or more wheel alignment parameters. Except for the wheels, elements of the vehicle are omitted for ease of illustration.

The wheel alignment system includes a pair of passive heads 21 and 23 mounted on respective wheels 22 and 24 of the vehicle, which are front steering wheels in this first example. The active sensing heads 25 and 27 are adapted for mounting in association with other respective wheels 26 and 28 of the vehicle, in this case the rear wheels. Each active sensing head includes an image sensor 29 or 31 for producing image data, which is expected to include an image of a passive target when the various heads are mounted to the respective wheels of the vehicle 20. In this first example, the image sensors 29 and 31 in the active sensing heads 25 and 27 are two dimensional (2D) imaging devices, e.g. cameras.

The heads 21 and 23 are passive in that they include targets but do not include any sensing elements. Each of the passive heads 21 and 23 includes a target of a type that may be observed by one of the image sensors 29 or 31 in the active heads 25 and 27. A target on a passive head 21 or 23, for image sensing by a sensor on another head, may be active or passive. An active target, such as a light emitting diode (LED), is a source driven by power to emit energy (e.g. IR or visible light) that may be detected by a sensor. A passive target is an element that is not driven by power and does not emit energy for detection by a sensor. Assuming an image sensor in head 25 or 27, a passive target would be an object that reflects (or does not reflect) light or other energy in a manner detectable by the respective image sensor. In the example, although the targets could comprise one or more light emitting elements, the targets comprise light and dark regions that can be detected when illuminated by other sources and imaged by cameras or the like in the active sensing heads 25 and 27.

Figure 1A:
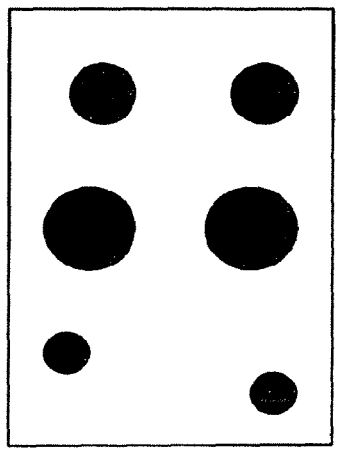
FIGS. 1A and 1B illustrate different types of targets that may be used on passive heads.
Figure 1B:
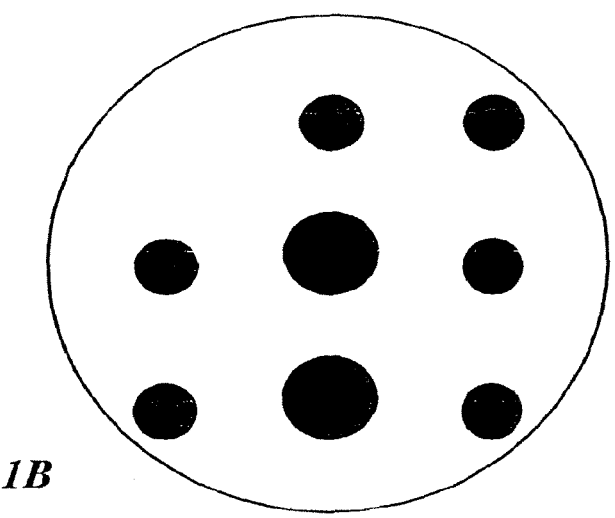

A first example of a target that can be used on either of the passive wheel heads 21 is illustrated in FIG. 1A. In this first example, the target is rectangular. A second example of a target that can be used on either of the passive wheel heads 21 is illustrated in FIG. 1B. In this second example, the target is circular. In each case, the target consists of a flat plate with a pattern of differently sized circles marked on or mounted on the surface of the plate in a pre-determined format and pattern. Although specific patterns are shown FIGS. 1A and 1B, it will be evident that a large number of different patterns can be used on each target. For example, a larger or smaller number of dots may be included and other sizes and shapes can be used for the dots. As another example, multifaceted plates or objects can also be used for the targets. Many examples utilize a number of retro-reflective elements arranged to form each target. For further information, attention is directed to U.S. Pat. No. 5,724,743 to Jackson.

The system also includes a spatial relationship sensor associated with at least one of the active sensing heads 25 or 27. The spatial relationship sensor enables measurement of the spatial relationship between the active sensing heads 25 and 27 when the active sensing heads are mounted on wheels of the vehicle. In general, spatial relationship sensors may measure relative position and/or orientation, depending on the type of sensor used. A positional measurement refers to the relative position of the measured item from the perspective or in the coordinate system of the measuring device. Measurement of position generally uses a standard coordinate system such as Cartesian coordinates or polar coordinates. Orientation may be derived from a three-dimensional position measurement, or orientation may be measured independently of position. Orientation relates to the rotational position of the measured device with respect to the measuring device expressed in a standard coordinate system. Orientation is generally expressed in rotational angles in three orthogonal reference planes.

It will be readily apparent to someone skilled in the art that the wheel alignment systems discussed herein may be implemented with various different types of spatial relationship sensors. In this first example, the system uses two conventional (1D) angle sensors 33 and 35 to measure the relative angles of the active sensing heads 25 and 27, in the toe plane.

The active heads 25 and 27 also contain gravity sensors or the like to measure tilt, typically camber and pitch, of the head. In this first example, the head 25 includes one or more tilt sensors 37; and the head 27 includes one or more tilt sensors 39.

As shown in a more detailed example later (regarding FIG. 2), the system also includes a computer. The computer processes image data relating to observation of the targets and tilt data, from the active sensing heads. The computer also processes spatial relationship data from the at least one spatial relationship sensor. The data processing enables computation of at least one measurement of the vehicle.

Measurement using image processing techniques is fundamentally different than using conventional angle measurement technology in a wheel alignment system. Although basic image processing techniques are known to those skilled in the art, a brief description is presented for clarity. The image of a body varies according to the perspective from which such body is viewed and the variation in the image is directly related to and determinable from the perspective angle of the view path along which the body is viewed. Furthermore it is known that it is possible to determine the perspective angles at which an object is viewed merely by relating the perspective image of that object with a true non-perspective image thereof. Conversely put, it is possible to determine the angles at which an object is orientated to a view path (or a plane perpendicular thereto) by comparing a perspective image of an object with a non-perspective image thereof.

In practice, a mathematical representation, or data corresponding to a true image (i.e. an image taken by viewing the target perpendicularly to its primary plane) and the dimensions of the target are preprogrammed into the memory of the computer so that, during the alignment process, the computer has a reference image to which the viewed perspective images of the targets can be compared.

The way that the computer calculates the orientation of the target is to identify certain geometric characteristics on the target, take perspective measurements of these and compare these measurements with the true image previously preprogrammed into the memory of the computer.

Furthermore, as the true dimensions of the target are preprogrammed into the memory of the computer, the method and apparatus of this invention can be used to determine the exact position of the target in three-dimensional space. This can be done by firstly determining the perspective image of certain of the elements of the pattern on the target (for example, the distances between circles) and comparing the dimensions of this image to the true dimensions of those elements. This will yield the distance that the element and, accordingly, the target is from the image sensor.

For the wheel alignment system discussed herein, the image sensor in the active head views a target attached to a wheel and produces image data which describes a perspective image of the target. The computer correlates the perspective image data for the targets with the true shape of the target. In so doing, the computer relates the dimensions of certain known geometric elements of the target with the dimensions of corresponding elements in the perspective image and by performing certain trigonometric calculations (or by any other suitable mathematical or numerical methods), calculates the alignment of the wheel of the vehicle. The computer can also calculate the three-dimensional position and orientation of the axis of rotation of the wheel (wheel axis) associated with the passive target.

For additional information regarding measurement based on processing of images of targets, attention again is directed to U.S. Pat. No. 5,724,743 to Jackson.

Figure 2:
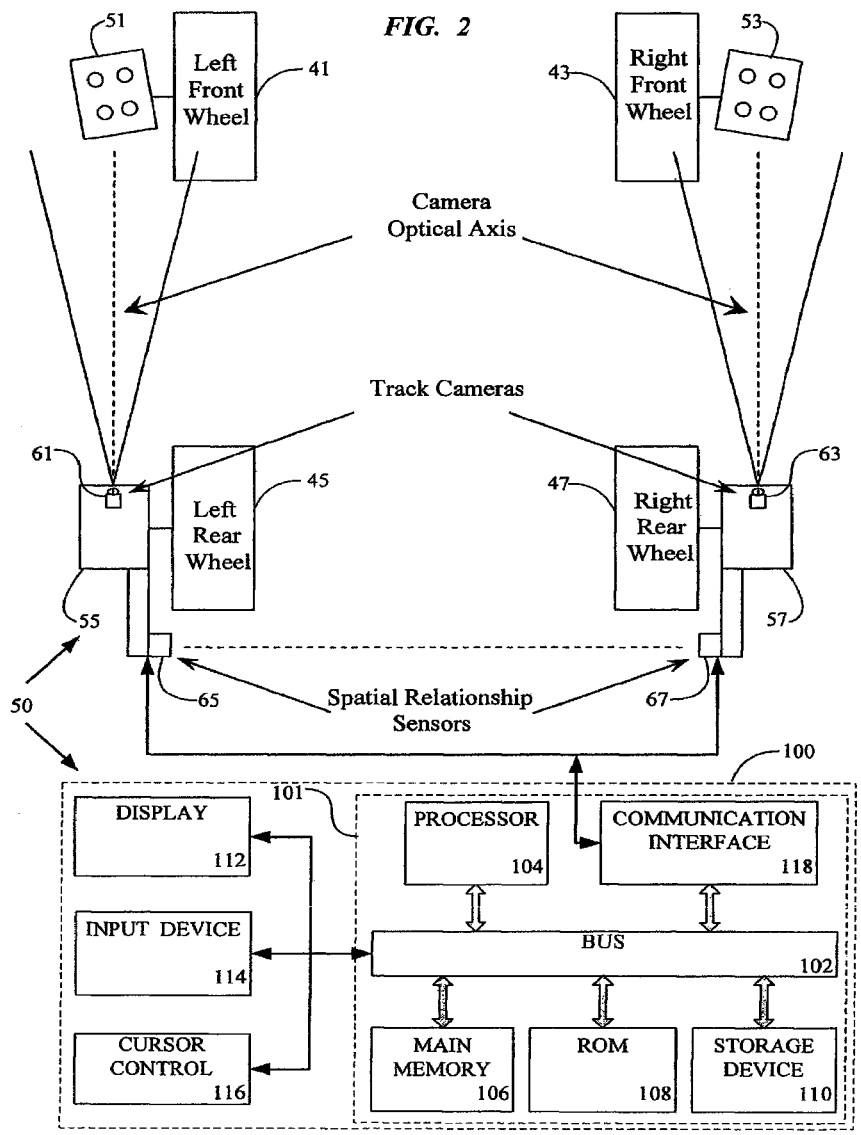
FIG. 2 is a functional block diagram of a hybrid wheel alignment system, with elements thereof mounted to wheels of a subject vehicle (although other elements of the vehicle are omitted for convenience).

FIG. 2 depicts a more comprehensive example of a low cost hybrid wheel alignment system 50 as well as four wheels 41, 43, 45 and 47 of a vehicle (otherwise not shown, for simplicity). The system 50 includes four heads 51, 53, 55 and 57 for mounting on or otherwise in association with the wheels 41, 43, 45 and 47 as shown stylistically in the drawing. A variety of different types of mounting devices may be used. In this example, the passive heads 51 and 53 are mounted on the front wheels 41 and 43, and the front heads 51 and 53 use retro-reflective targets. When mounted on the wheels as shown, the retro-reflective targets face rearward, so as to be observable by the image sensors in the respective active sensing heads. The retro-reflective targets may be similar to those used in three-dimensional (3D) machine vision alignment systems. The heads 55 and 57 mounted on the rear wheels 45 and 47 are active sensing heads, in that they include image sensing elements. In this example, the heads 55 and 57 further include tilt and spatial relationship sensing elements, as discussed below, for obtaining information for processing by a host computer system 100 of the wheel alignment system 50.

An imaging sensor, similar to the V3D camera, is positioned in each of rear heads. The optical axis of each such camera faces forward along the track of the vehicle, in order to measure the position and orientation of the targets attached to the front wheels. The cameras need not be directly on the track of the vehicle wheels, that is to say on the roll line of the wheels. The cameras need only to face alongside the wheel track sufficiently to view and capture images of the targets on the passive heads 51, 53 associated with the front wheels. In the example, the active sensing head 55 includes an image sensing module or the like containing an image sensor in the form of a camera 61 facing forward along the track of the left wheels. When so mounted, the field of view of the camera 61 includes the target portion of the passive head 51 mounted on the left front wheel 41. Similarly, the active sensing head 57 includes an image sensing module or the like containing an image sensor in the form of a camera 63 facing forward along the track of the right wheels. When so mounted, the field of view of the camera 63 includes the target portion of the passive head 53 mounted on the right front wheel 43.

One or more sensors are attached to the rear heads 55, 57 and positioned to measure a spatial relationship between the two active sensing heads. A variety of available sensing technologies may be used, and two examples are discussed, later. In the example illustrated in FIG. 2, the active sensing head 55 includes a sensor 65; and the active sensing head 57 includes a sensor 67. The sensors 65 and 67 in this application are used for sensing the relative angular relationship between the active sensing heads 55 and 57, whereas the image signals from the cameras 61 and 64 are processed to compute regular front wheel alignment parameters, such as camber and toe.

Each rear head 55 or 57 also incorporates one or more inclinometers, which are used as tilt sensors to measure the relative camber and pitch angles of each rear head to gravity. These inclinometers, for example, may comprise MEMS type devices designed to be integral to the track camera printed circuit board.

Figure 3:
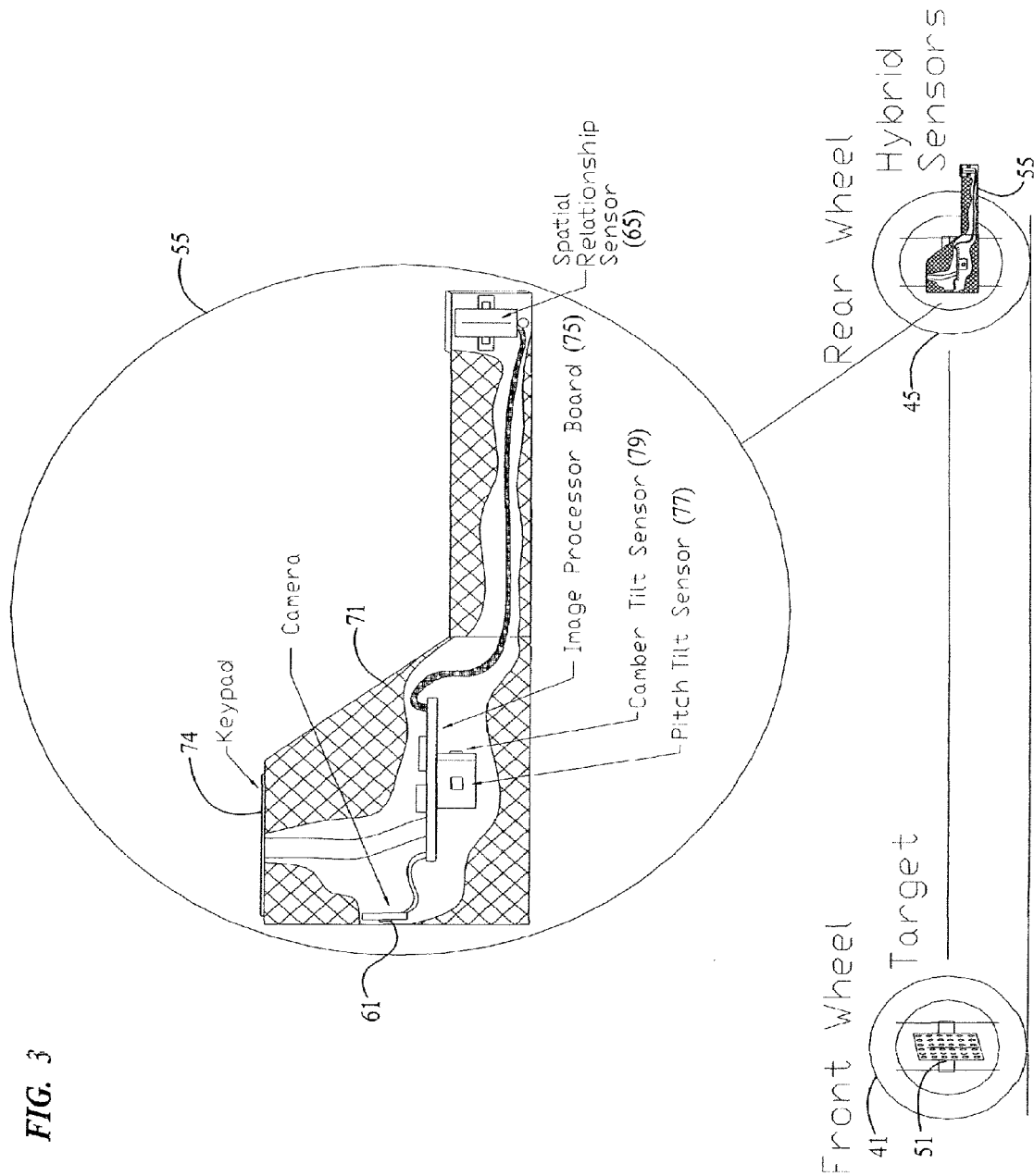
FIG. 3 is a side view of some of the wheel mounted components of the system, with one of the active sensor heads shown in a partial cross-sectional detail view.

FIG. 3 is a side view of some of the wheel mounted components of the system. This left side view shows the left front head 51, with its passive target, attached to the left front wheel 41. The side view also shows the left rear active sensing head 55, attached to the left rear wheel 45. FIG. 3 also provides an enlarged detail view, partially in cross section, of elements of the active sensing head 55.

As shown, the head 55 comprises a housing 71. Hardware for mounting the housing to the wheel is omitted for clarity. The housing 71 contains the forward facing track camera 61. In this example, the spatial relationship sensor 65 uses a beam angle detection technology, discussed later with regard to FIG. 6, although other types of sensors may be used. The housing also contains a keypad 74 for user activation of the head 55 and a printed circuit board 75 containing the data processing electronics for processing the data from the camera(s) and other sensors and communications with the host computer. For purpose of forming the sensing head of a hybrid system, the board 75 also supports a pitch tilt sensor 77 and a camber tilt sensor 79. Although shown separately, the two tilt sensors 77, 79 may be elements of a single inclinometer module. The sensors 77, 79 communicate inclination readings to a processor on the board 75, for transmission with the camera data to the host computer system 100.

Figure 4:
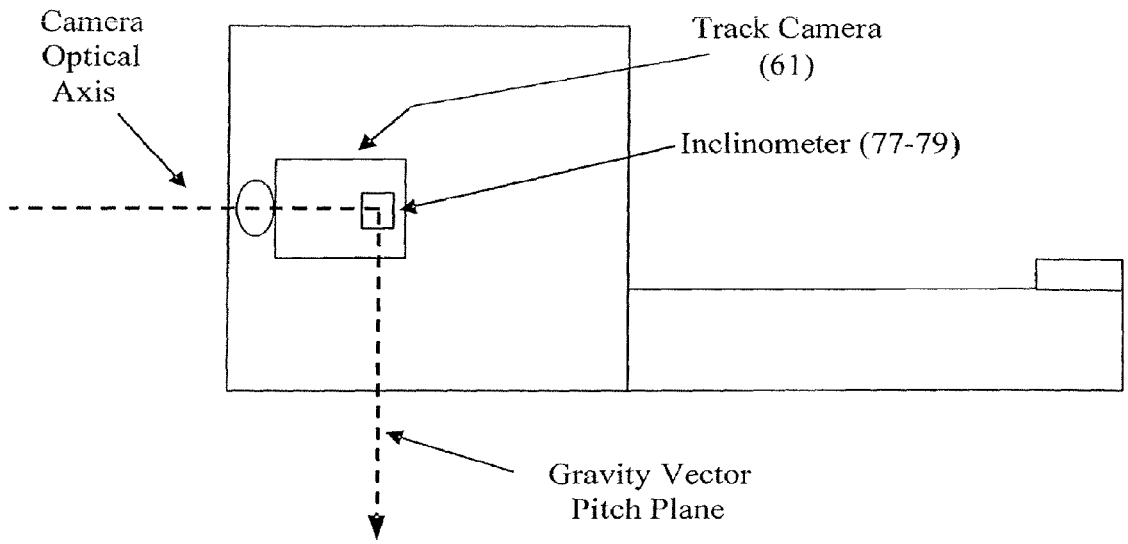
FIG. 4 is a side view of one of the active sensor heads useful in explaining the relationship of the camera axis to the pitch plane of the measured gravity vector.
Figure 5:
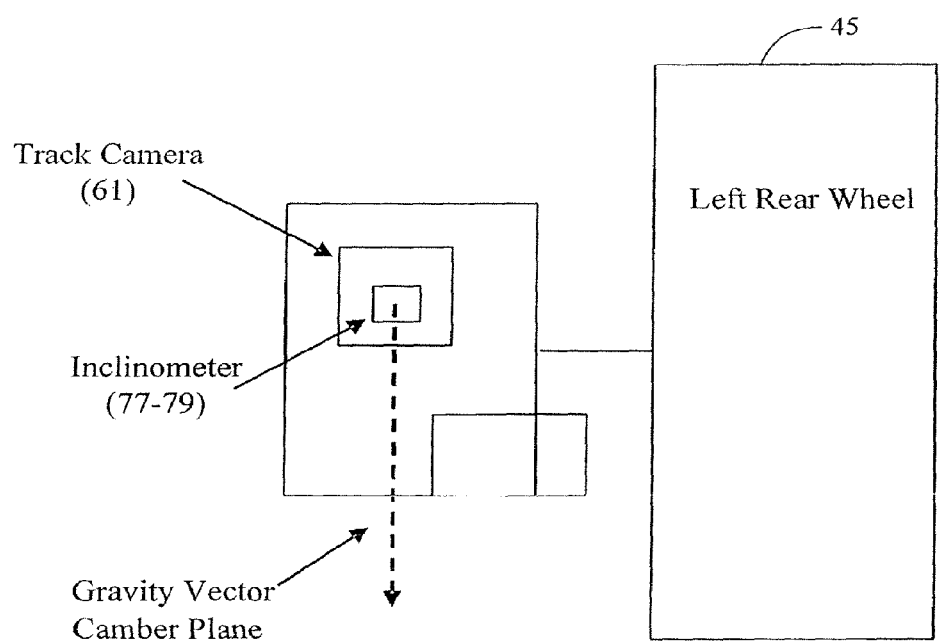
FIG. 5 is a rear view of one of the active sensor heads useful in explaining the relationship of the camera to the camber plane of the measured gravity vector.

FIGS. 4 and 5 are somewhat stylized illustrations of the active sensing head 55, in side and rear views, which illustrate the relationship of the axes measured by the tilt sensors to the other elements. It is assumed for discussion here that the tilt sensors 77-79 are elements of a single MEMS inclinometer. The inclinometer determines the gravity vector with respect to the pitch plane (FIG. 4) and the gravity vector with respect to the camber plane (FIG. 5). Similar measurements, of course, are taken for the other active sensing head 57 (FIG. 2). In this way, each head's orientation to gravity can be processed to relate each track facing camera's optical axis to gravity (FIGS. 4 and 5). In this way the relationship of each front target to gravity can also be measured by processing of the image data and the gravity vector data.

Figure 6:
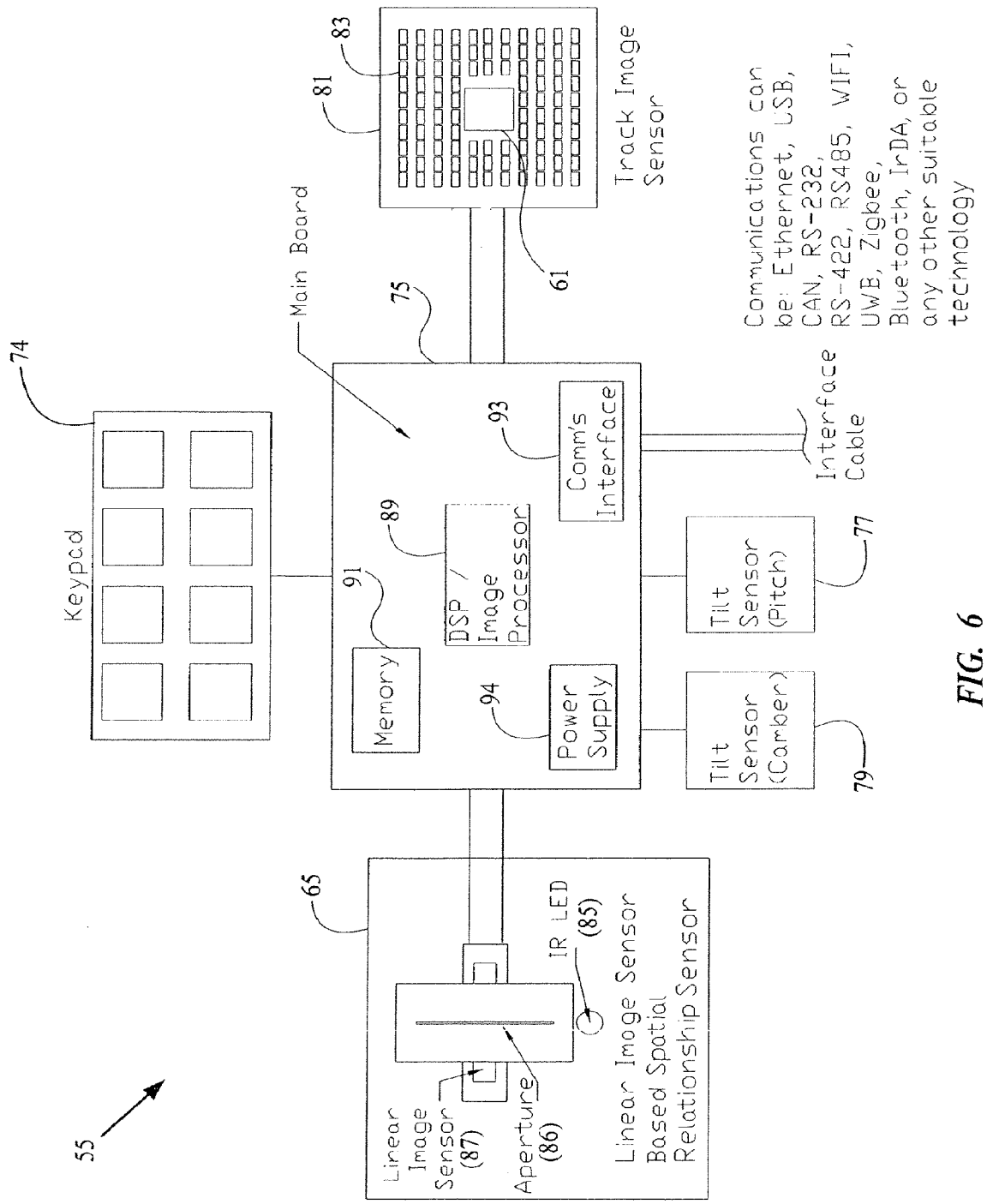
FIG. 6 is a functional block diagram of the components of one of the active sensor heads.

FIG. 6 is a functional block diagram of the elements of one of the active sensing heads, in this case the head 55, although the elements of the head 57 will be generally similar in this first example.

As discussed above, the active sensing head 55 includes an image sensing module 81 or the like containing an image sensor in the form of the track camera 61 which in use will face forward along the track of the left wheels to allow that camera to obtain images containing the target of the passive head 51 (see also FIG. 2). The track facing image sensor module 81, illustrated in FIG. 6, includes an LED array 83, serving as an illuminator, to emit light for desired illumination of the target on the head 51 mounted to the vehicle wheel 41 on the same side of the vehicle. The camera 61 is a digital camera that senses the image for the wheel alignment application. In operation, the camera 61 generates a value of each image pixel based on analog intensity of the sensed light at the point in the image corresponding to the pixel. The value is digitized and read out to circuitry on the main printed circuit board 75. The value may be digitized either on or off of the camera sensor chip.

In this implementation, the spatial relationship sensor module 65 comprises an IR LED 85, an aperture 86 and a linear image sensor 87 such as a charge-coupled device (CCD) or CMOS unit. The IR LED 85 projects a beam of light toward a similar toe sensor module in the opposite head 57. In a similar manner, the opposite head 57 includes an IR LED that projects a beam of light toward head 55.

The IR light/radiation from the IR LED of the opposing head 57 is sensed by the linear image sensor 87, via the aperture 86. The precise point on the sensor 87 at which the IR light from the other head is detected indicates the relative angle of incidence of the light from the opposite head at the sensor 87 in the head 55. In a similar fashion, the IR light/radiation from the IR LED 85 of the head 55 is sensed by the linear image sensor, via the aperture in the opposite head 57; the precise point on the opposite linear image sensor at which the IR light from the LED 85 is detected indicates the relative angle of incidence of the light from the head 55 at the linear sensor in head 57. Processing of the angle detection data from the two linear sensors enables determination of the angular relationship between the optical camera axes of the cameras 61 and 63 in the two active sensing heads.

The circuit board 75 includes a digital signal processor (DSP) or other image processor type circuit and an associated data/program memory 91. In operation, each camera 61, 63 supplies digital image data to the image processing circuitry 89. As shown, the active sensing head 55 also includes the camber tilt sensor 79 and the pitch tilt sensor 77. These inclinometer elements supply the gravity angle measurements (see discussion of FIGS. 4 and 5) to the processor 89. The image processing circuitry 89 performs one or more operations on the data and supplies the data to a communications interface 93, for transmission to the host computer system 100.

The image processing operations of the circuit 89 may involve formatting various data for communication. Alternatively, the processor 89 may implement some degree of pre-processing before transmission to the host computer system 100. With regard to the image data, image pre-processing may include gradient computation, background subtraction and/or run-length encoding or other data compression (see e.g. U.S. Pat. No. 6,871,409 by Robb et al.). The processor 89 may also process the image data to some degree in response to the tilt data from the tilt sensors 77, 79 and/or the spatial relationship measurement data. Alternatively, the tilt and cross position data may simply be forwarded to the host computer for use in further processing of the image data.

The processor 89 in one of the active heads may be configured to receive data from the other head and perform wheel alignment parameter computations, internally, and then send only the vehicle measurement results to the host computer system 100. Moreover, processor 89 in one of the active heads may be configured to calculate all alignment values and also generate the user interface. In this case the active head may act as a web server to serve web pages that implement the user interface for the wheel alignment system, and the host computer may consist of any general purpose computer with a web browser and no wheel alignment specific software. However, to minimize cost, the major portion of the data processing may be performed at the host, in which case the processing by (and thus complexity of) the DSP/processing circuit 89 may be kept to a minimum.

The processor 89 or another controller (not separately shown) on the board 75 also provides control over operations of the active sensing head 55. For example, the control element (processor 89 or other controller) will control the timing and intensity of emissions by the LED array 83 and the IR LED 85 as well as the timing and possibly other operational parameters of the camera 81 and the linear image sensor 87. The active sensing head 55 also includes a keypad 74 for user activation of the head 55, and the processor 89 or other controller will sense and respond to inputs via the keypad 74.

The computer communication interface 93 provides two-way data communications for the components of the active sensing head 55 with the host computer 100 (FIG. 2) and in some configurations between the active heads. The communications interface 93 conforms to an appropriate data protocol standard and provides a coupling to a desired physical media, to enable data communication to and from the host computer 100 at desired speeds and in a manner desired for the particular installation. For example, the host communications interface may be a USB interface with a USB connector for cable connection to a matching interface in the host computer 100. Those skilled in the art will recognize that other data communications interfaces may be used in wheel alignment systems, such as Ethernet, RS-232, RS-422, RS-485, WIFI or wireless Ethernet, Zigbee, Bluetooth, UWB (Ultra-Wideband), IrDA, or any other suitable narrowband or broadband data communication technology.

Electronic circuits on board 75 as well as elements of image sensing module 81 and spatial relationship sensor module 85 receive power from a supply 94. Any conventional supply of an adequate level of voltage and current may be used. If system 50 uses cables, the supply may run from a conventional AC power grid or receive power over USB or Ethernet cabling. If heads 55 and 57 are wireless, the power supply may utilize battery power, either from rechargeable or disposable batteries. Alternatively, power storage media for wireless heads may consists of super-capacitors.

Returning to FIG. 2, host computer system 100 processes data from the active sensing heads 55, 57 and provides the user interface for the system 50. As noted above, data processing could be done in a DSP or the like in one or more of the active sensing heads 55, 57. However, to minimize the cost of the heads 55 and 57, main processing power may be provided by the host computer system 100 or similar data processing equipment. In the example, the system 100 may be implemented by a desktop type personal computer (PC) or other computer device such as a notebook computer, UMPC (ultra mobile PC), or similar device. A client server arrangement also could be used, in which case the server would perform the host processing and one of the active heads or another user device would act as a client to provide the user interface. Although those skilled in advanced wheel alignment technologies will be familiar with the components, programming and operation of various suitable computer systems, it may help to provide a brief example.

Computer system 100 includes a central processing unit (CPU) 101 and associated elements for providing a user interface. The CPU section 101 includes a bus 102 or other communication mechanism for communicating information, and a processor 104 coupled with the bus 102 for processing information. Computer system 100 also includes a main memory 106, such as a random access memory (RAM) or other dynamic storage device, coupled to bus 102 for storing information and instructions to be executed by processor 104. Main memory 106 also may be used for storing temporary variables or other intermediate information during execution of instructions by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions. Although only one is shown, many computer systems include two or more storage devices 110.

The illustrated embodiment of the computer system 100 also provides a local user interface, for example, so that the system appears as a personal computer or workstation as might be used in a wheel alignment bay or an auto service shop. The computer system 100 may be coupled via bus 102 to a display 112, such as a cathode ray tube (CRT) or flat panel display, for displaying information to a computer user. An input device 114, including alphanumeric and other keys, is coupled to bus 102 for communicating information and command selections to processor 104. Another type of user input device is cursor control 116, such as a mouse, a trackball, or cursor direction keys for communicating direction information and command selections to processor 104, which the CPU 101 in turn uses for controlling cursor movement on display 112. The cursor input device 116 typically has two degrees of freedom in two axes, a first axis (e.g., x) and a second axis (e.g., y), that allows the device to specify positions in a plane. The couplings between the user interface elements 112-116 and the CPU 101 may be wired or may use optical or radio frequency wireless communication technologies.

The CPU 101 also includes one or more input/output interfaces for communications, shown by way of example as an interface 118 for two-way data communications with the active sensing heads 55 and 57. For purpose of the wheel alignment application, the interface 118 enables the CPU to receive image data, spatial relationship measurement data and tilt data from the active sensing heads 55 and 57. Typically the interface 118 also allows the host computer system 100 to send operational commands and possibly software downloads to the active sensing heads 55 and 57. For example, the communications interface 118 may be a USB interface with a USB connector for cable connection to matching interfaces 93 in the active sensing heads 55, 57. Those skilled in the art will recognize that other data communications interfaces may be used in wheel alignment systems such as Ethernet, RS-232, RS-422, RS-485, WIFI or wireless Ethernet, Zigbee, Bluetooth, UWB, IrDA or any other suitable narrowband or broadband data communication technology.

Although not shown another communication interface may provide communication via a network, if desired. Such an additional interface may be a modem, an Ethernet card or any other appropriate data communications device. The physical links to and from the additional communication interface(s) may be optical, wired, or wireless.

Although the computer 100 may serve other purposes in the shop, the alignment system 50 uses the computer system 100 for processing data from the heads 55, 57 to derive desired alignment measurements from the data provided by the heads, and to provide the user interface for the system 50. The computer system 100 typically runs a variety of applications programs and stores data, enabling one or more interactions via the user interface, provided through elements such as 112-116 to implement the desired processing. For wheel alignment applications, the programming will include appropriate code to process the data received from the particular implementation of the heads 55, 57, including computations to derive desired vehicle wheel alignment measurement parameters from the various data from the heads 55 and 57. The host computer 100 will typically run a general purpose operating system and an application or shell specifically adapted to perform the alignment related data processing and provide the user interface for input and output of desired information for alignment measurements and related services. Since it is a general purpose system, the system 100 may run any one or more of a wide range of other desirable application programs.

The components contained in the computer system 100 are those typically found in general purpose computer systems used as servers, workstations, personal computers, network terminals, and the like. In fact, these components are intended to represent a broad category of such computer components that are well known in the art.

At various times, the relevant programming for the wheel alignment application may reside on one or more of several different media. For example, some or all of the programming may be stored on a hard disk or other type of storage device 110 and loaded into the Main Memory 106 in the CPU 101 for execution by the processor 104. The programming also may reside on or be transported by other media for uploading into the system 100, to essentially install and/or upgrade the programming thereof. Hence, at different times all or portions of the executable code or data for any or all of the software elements may reside in physical media or be carried by electromagnetic media or be transported via a variety of different media to program the particular system and/or the electronics of the active sensing heads 55, 57. As used herein, terms such as computer or machine "readable medium" therefore refer to any medium that participates in providing instructions to a processor for execution. Such a medium may take many forms, including but not limited to, non-volatile media, volatile media, and transmission media (e.g. wires, fibers or the like) as well as signals of various types that may carry data or instructions between systems or between system components.

Runout compensation for the heads could be performed as with traditional conventional alignment heads by elevating the rear wheels and using the camber sensors to measure the runout vector then elevating the front wheels and using cameras to image the targets as they rotate about the front wheel's axis. An alternate method would be to avoid elevating the wheels by rolling the vehicle along the lift and performing the runout measurements on the heads with the inclinometers as the track cameras image the front targets as well as fixed targets on the lift, vehicle or other stationary object in order to establish the fixed coordinate system.

As noted, the rear heads 55, 57 incorporate inclinometer type tilt sensors to measure the relative camber and pitch angles of each rear head to gravity. Once runout is taken and the inclinometer angle values are measured, each head's orientation to gravity could be processed to relate each track facing camera's optical axis to gravity. Using the relationship of the track facing camera to gravity and the measured relationship of the front target to the track facing camera, the relationship of the front target to gravity can be calculated. A spatial relationship is measured by the sensors 65 and 67, to determine the spatial relationship between the track cameras 61 and 63.

Front toe, caster, and SAI would be measured using techniques similar to those embodied in an imaging aligner, such as the V3D aligner. The rear thrust angle, each rear individual toe, and the horizontal angular relationship of the track cameras to each other, would be derived from the measurements obtained by the rear spatial relationship sensors. The inclinometers would relate each track camera to each other through the common gravity vector references. With the track cameras effectively related to each other along the axis of the rear thrust line, each front target's location and orientation can be determined in a coordinate system that is directly related to the thrust angle and to gravity.

Calibration may be performed by mounting each rear head on a straight calibration bar in much the same way that the current conventional heads are calibrated. The bar is first rotated to compensate for runout. The zero offset of the rear spatial relationship sensors can then be set and by leveling the calibration bar, each camber sensor zero offset can be set. The pitch zero offset is set by leveling the head with a precision level bubble and recording the pitch inclinometer value. Enhanced camera calibration may be achieved by adding another calibration bar adapted to mount the front targets in view of the track cameras (see e.g. U.S. Patent Application Publication No. 2004/0244463 by James Dale, Jr.). After the initial calibration above is performed, the track cameras measure the orientation of the front targets as the targets and bar are rotated about the axis of the front calibration bar. The relationship of one camera to the other may be calculated and thus the relationship of each camera to the rear spatial relationship checked or calibrated. By leveling the front target calibration bar, the fixed relationship of each track camera to the local inclinometers may also be checked. This redundant check could possibly constitute an ISO check for customers that require measurement accuracy traceability.

In addition, small targets may be affixed to each front turntable allowing for an additional measurement or cross check of turn angle.

The V3D ride height pointer may also be used to measure front body points for ride height or other body index purposes.

It will be readily apparent to someone skilled in the art that the wheel alignment systems discussed herein may be implemented with various different types of spatial relationship sensors. An image sensor is one type of spatial relationship sensor. An image sensor may consist of a camera with a two dimensional array of sensing elements that produces data representative of an image expected to contain a target within the field of view of the sensor. The data from the image sensor can be processed to determine position and orientation information related to the viewed target and thus the head, wheel or other object with which the target is associated. An example of a prior art image sensor is the camera used in the Visualiner 3D commercially available from John Bean Company, Conway, Ark., a division of Snap-on Incorporated. An angle sensor is another type of applicable spatial relationship sensor. An angle sensor produces data representing the angle from the sensor relative to a point. Various types of angle sensors are generally known. One example of an angle sensor is the linear CCD sensor as used in the Visualiner available from John Bean Company.

Figure 7:
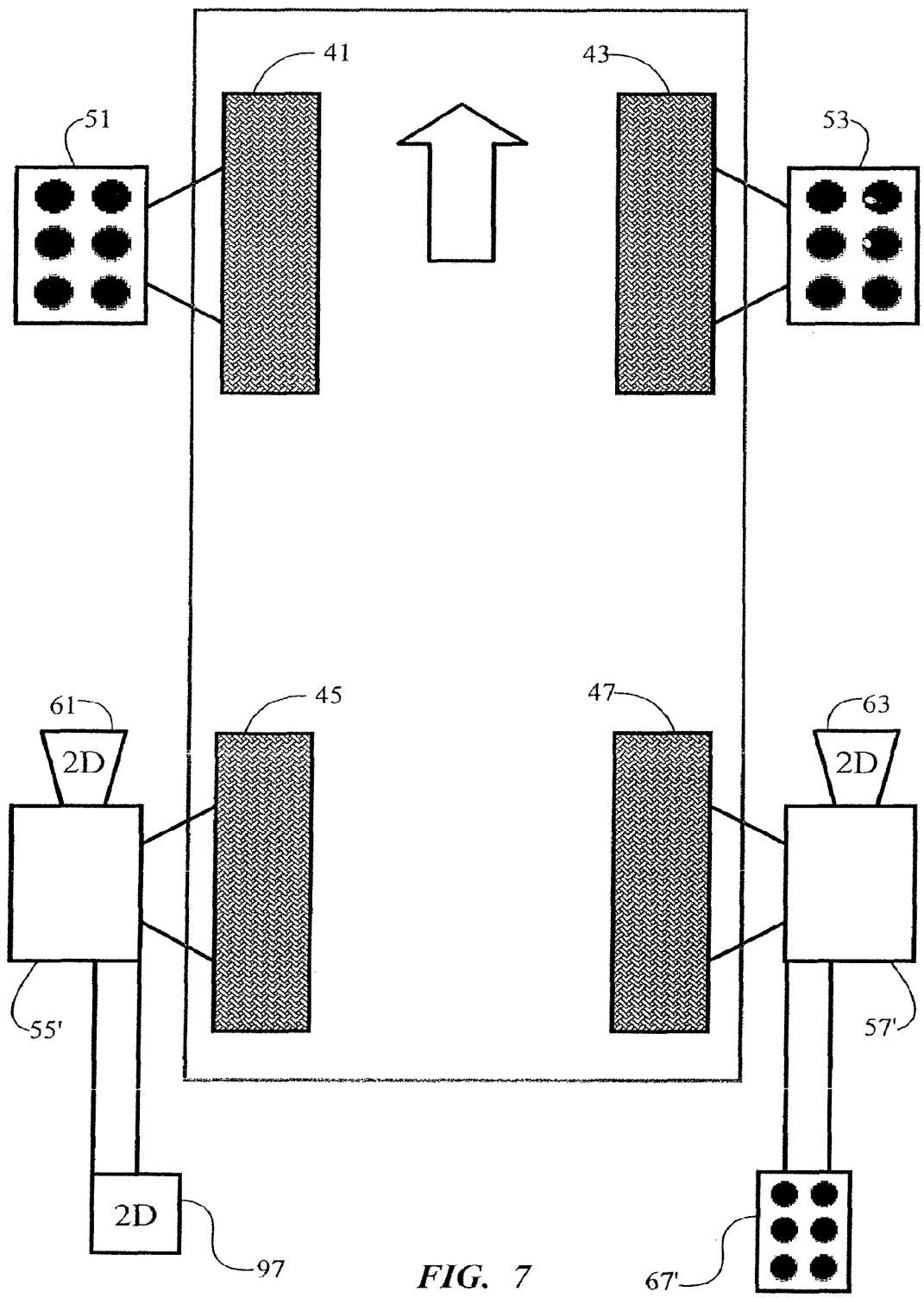
FIG. 7 diagrammatically illustrates another arrangement of targets and active sensing heads in relation to vehicle wheels, in this case using additional targets and image sensing for measurement of the spatial relationship between the active heads.
Figure 8:
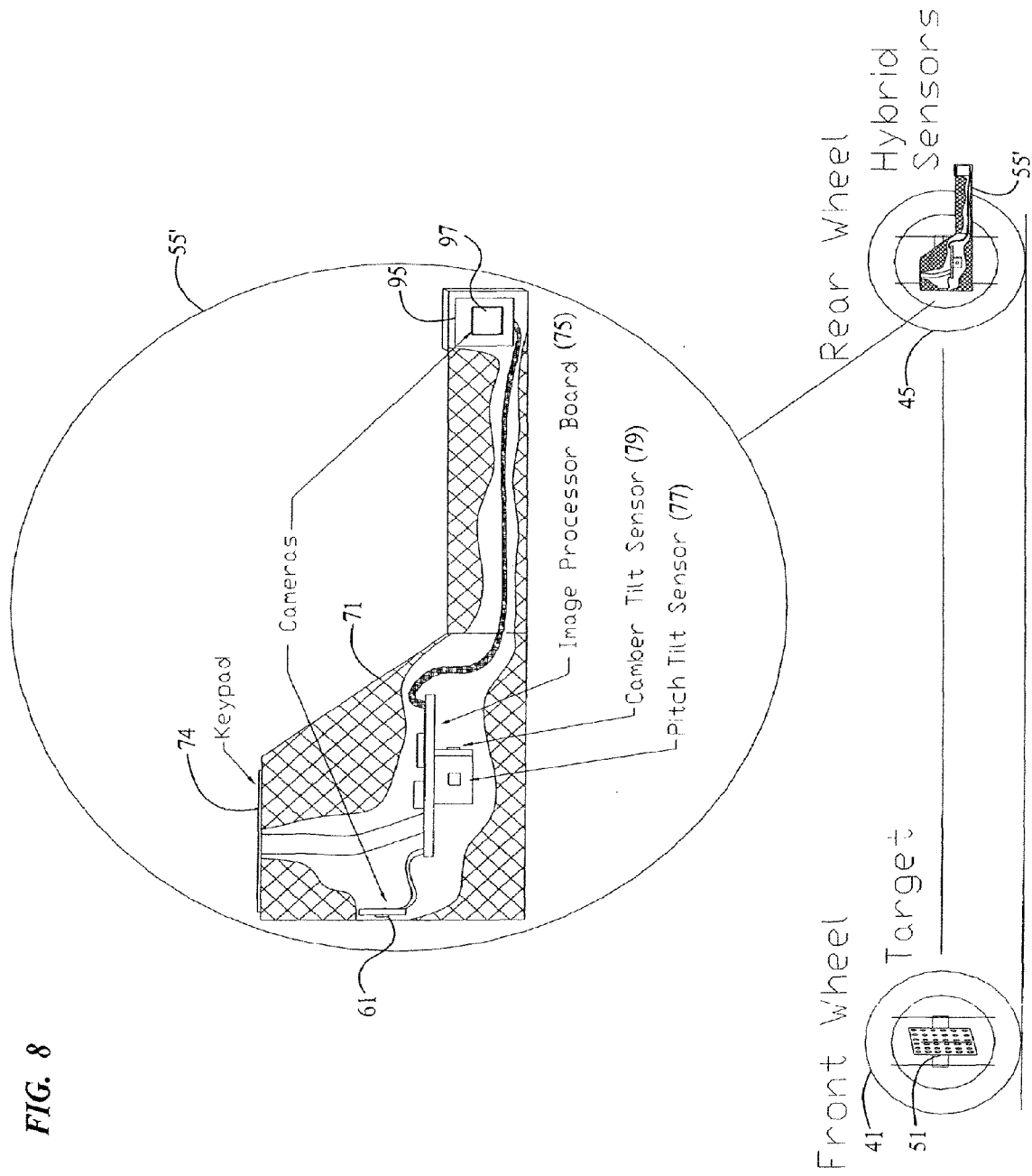
FIG. 8 is a side view of some of the wheel mounted components of the system of FIG. 7, with one of the active sensor heads shown in a partial cross-sectional detail view, generally like that of FIG. 3; but wherein the spatial relationship sensor utilizes another camera.
Figure 9:
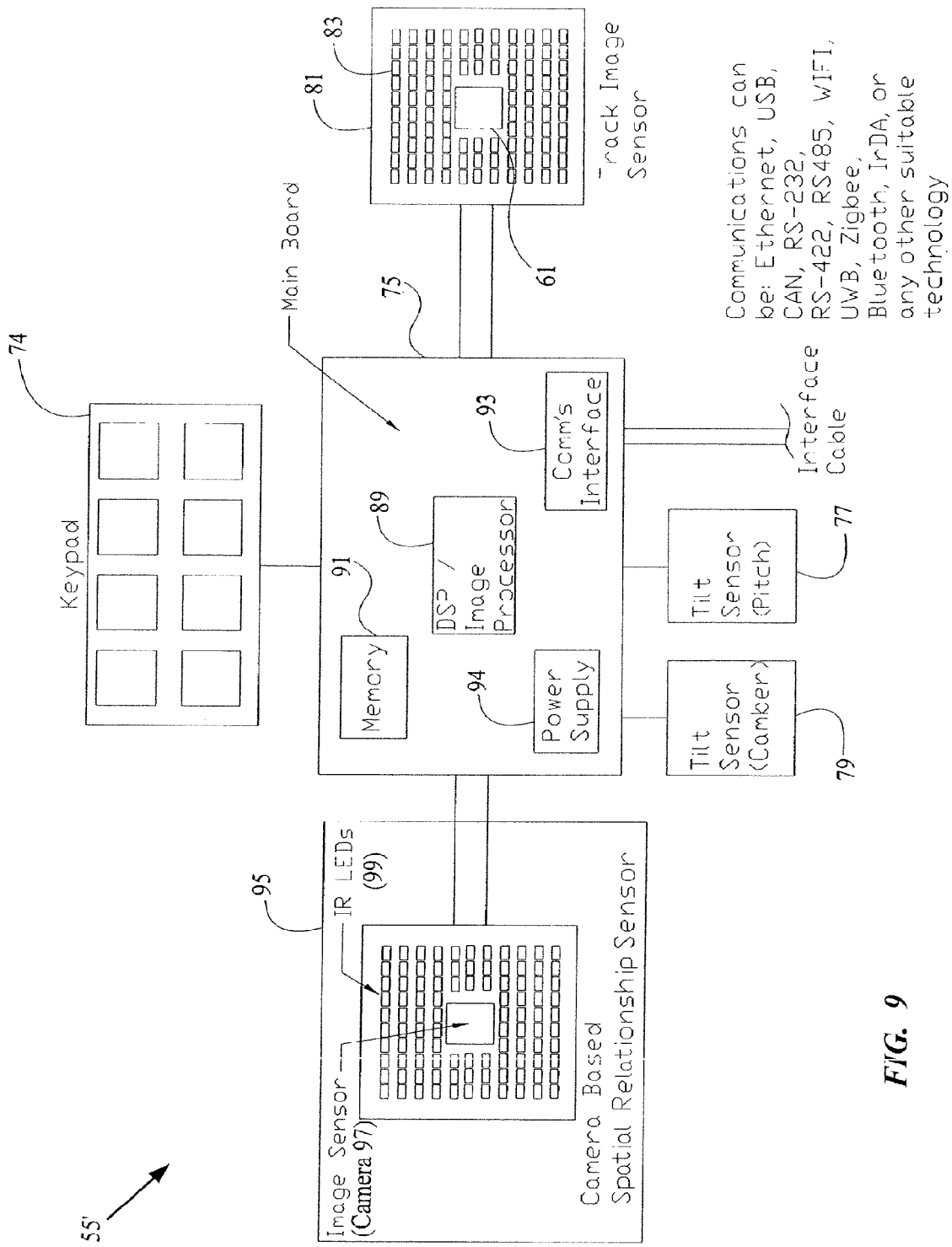
FIG. 9 is a functional block diagram of the components of the active sensor heads shown in the detail view in FIG. 7.

Hence, it may be helpful now to consider an example in which the aperture and linear image sensor style spatial relationship sensing arrangement described above relative to FIGS. 3 and 6 is replaced by an imaging type camera similar to the track camera. FIGS. 7 to 9 are views/diagrams similar to those of FIGS. 1, 3 and 6, except that the illustrations of this second implementation show such an alternate technology using a target and image sensor for the spatial relationship sensing function. Wheels and elements similar to those of the implementation of FIGS. 1, 3 and 6 are similarly numbered and are constructed and operate in essentially the same fashion as discussed above. This example uses passive two-dimensional targets 51 and 53 on the front wheels 41 and 43; and it uses active heads 55' and 57' on the rear wheels for the measurements alongside the vehicle tracks, much as in the example of FIG. 1. The rear active sensing heads use cameras 61, 63 or similar 2D image sensors to obtain images of the targets on the front heads 51, 53 and determine the relative positions and orientations of the targets with respect to the active heads, as discussed in detail above relative to FIG. 2. However, the spatial relationship of the two active heads 55', 57' is determined by at least one 2D image sensor 97, which obtains images of a 2D target 67' mounted on the opposite active head. In this example, the active head 57' has an associated target 67' similar to one of the targets on head 51 and 53, but the head 57' does not include a sensor for the spatial relationship measurement function. The active sensing head 55' uses an image processing type approach to the spatial relationship measurement across the rear of the vehicle based on imaging the target 67'. The image sensor 97 typically would be similar to the cameras or the like used as 2D image sensors in the example of FIG. 2.

As shown in more detail in FIGS. 8 and 9, the spatial relationship sensor 95 uses an image sensing module similar to the track facing image sensor module 81. The spatial relationship image sensing module 95 includes a digital camera 97 and an LED array 99. The LED array 99 serves as an illuminator. For the spatial relationship sensing application, the LED array 99 produces infrared (IR) illumination. The other rear head 57' includes an IR sensitive retro-reflective target 67' (FIG. 7) to be illuminated by the LED array 99, which in turn is sensed by the camera 97.

The spatial relationship camera 97 images the target 67' positioned on the companion head (across the rear of the vehicle) in place of the other spatial relationship sensor. Both cameras 61 and 97 could share a common processing board in the one head while the other head may simply use a single camera (for track) and a target (for cross). Processing of the target image obtained by camera 97 can compute the angular spatial relationship between the rear heads, in much the same way as the images from the active head cameras were processed to determine relative angle and/or position of the wheel mounted targets in the examples of FIGS. 1 and 2. Rather than measuring a spatial relationship angle as in the previous example, the image sensing module and associated image processing measures the 3D spatial relationship of the target on the opposite active head. For additional information regarding measurement based on processing of images of targets, attention again is directed to U.S. Pat. No. 5,724,743 to Jackson.

In the system of FIGS. 7 to 9, at least one active head contains gravity sensors to measure camber and pitch of the head. Since the imaging of the target mounted on the opposite active head allows the system to obtain a three-dimensional (3D) spatial relationship measurement between the two active heads, only one active head is required to have gravity sensors. Otherwise, the structure, operation and computations are generally similar to those of the earlier examples.

In the examples discussed above, the active heads have been associated with the rear wheels, and the targets have been associated with the front wheels of the vehicle. However, those skilled in the art will understand that there are many variations of the basic configurations discussed above. Also, there are a variety of different combinations of imaging sensors with other sensors for determining the spatial relationship that may be used. Several are described and shown below.

Figure 10:
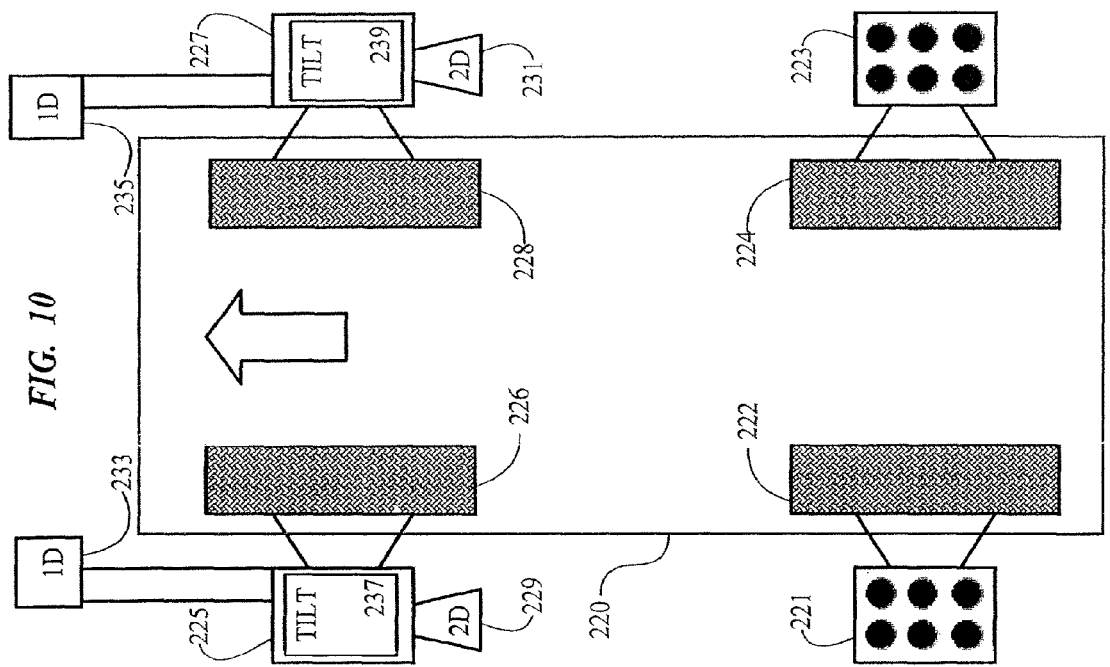

FIG. 10, for example, shows an arrangement similar to that of FIG. 1 in which the active heads and the target heads are reversed. The wheel alignment system of FIG. 10 includes a pair of passive heads 221 and 223 mounted on respective wheels 222 and 224 of the vehicle 220, which are rear wheels in this example. The active sensing heads 225 and 227 are adapted for mounting in association with the respective front wheels 226 and 228 of the vehicle 220. Again, each active sensing head includes an image sensor 229 or 231 for producing image data, which is expected to include an image of a passive target when the various heads are mounted to the respective wheels of the vehicle. In this example, the image sensors 229 and 231 in the active sensing heads 225 and 227 are two dimensional (2D) imaging devices, e.g. cameras similar to the track cameras in the earlier examples.

The heads 221 and 223 are passive in that they include targets of a type that may be observed by one of the image sensors in the active heads 225 and 227, but they do not include any sensing elements. Typically, the targets comprise light and dark regions that can be detected when illuminated by other sources and imaged by cameras or the like in the active sensing heads 225 and 227.

As in the earlier examples, the system also includes a spatial relationship sensor associated with at least one of the active sensing heads 225 or 227. The spatial relationship sensor enables measurement of the spatial relationship between the active sensing heads 225 and 227 when the active sensing heads are mounted on wheels of the vehicle. In this example, the system uses two conventional (1D) angle sensors 333 and 335 to measure the relative angles of the active sensing heads 225 and 227, in the toe plane. The active heads 225 and 227 also contain gravity sensors or the like to measure tilt, typically camber and pitch, of the head. Hence, the head 225 includes one or more tilt sensors 337; and the head 227 includes one or more tilt sensor 339.

As shown in the earlier examples (e.g. FIG. 2), the system also includes a computer. The computer processes image data relating to observation of the targets and tilt data, from the active sensing heads. The computer also processes spatial relationship data from the at least one spatial relationship sensor. The data processing enables computation of at least one measurement of the vehicle.

As noted, this example is essentially a front-to-rear reversal of the target/active sensing head positions from that of the example of FIG. 1. Although not all variants are shown, those skilled in the art will understand that similar types of front-to-rear variants and/or left-to-right variants can also be implemented for every other alternative arrangement discussed herein.

Figure 11:
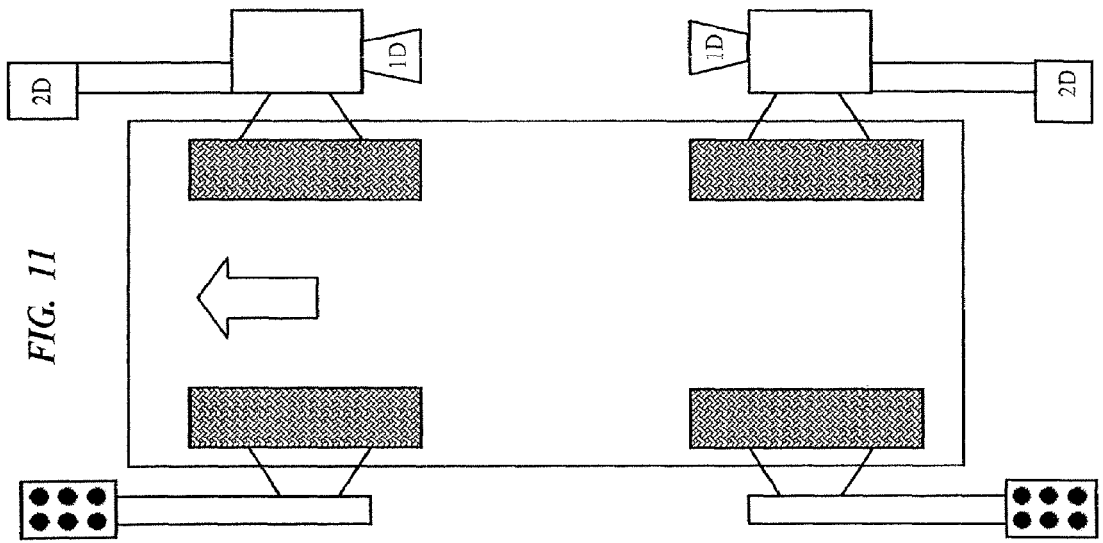
FIGS. 10 to 18 diagrammatically illustrate a series of alternative arrangements, having various heads/targets associated with different combinations of the vehicle wheels and using various different configurations or equipment for spatial relationship sensing.

FIG. 11 illustrates another alternative arrangement. In this example, two active sensing heads are mounted on one side of the vehicle, and two passive sensors are mounted on the opposite side of the vehicle. As shown, the mounting of the targets on the passive heads provides an extension out away from the wheels, somewhat, so as to allow the image sensors in the active heads to see and image the targets. Each active head contains an image sensor that obtains images of a target attached to the corresponding wheel on the opposite side of the vehicle. As in the earlier examples, each active head contains gravity sensors to measure camber and pitch of the head. Here, the spatial relationships of the two active heads are determined by two conventional angle sensors measuring the toe plane angles between the two heads. Since the structure, operation and computations are generally similar to those of the earlier examples, those skilled in the art should understand the example of FIG. 11 without a more detailed discussion here.

Figure 12:
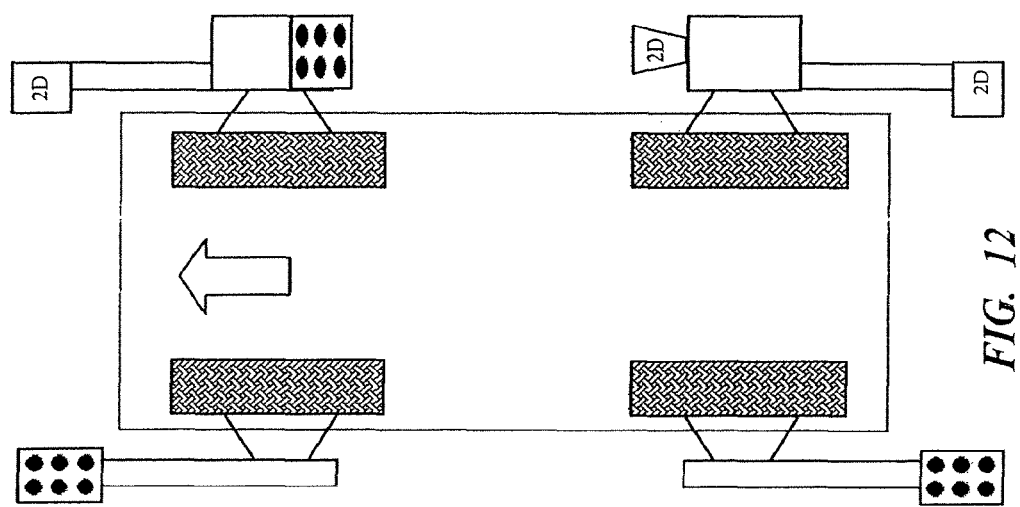

FIG. 12 illustrates another alternative arrangement. In this example, two active sensors are mounted on one side of the vehicle, and two passive sensors are mounted on the other side of the vehicle. Each active head contains image sensors that obtain images of targets attached to the corresponding wheel on the opposite side of the vehicle. Here, the spatial relationships of the two active heads are determined by one or more image sensors that obtain images of a target mounted on the opposite active head. In the example, the front active head includes a target, and the rear active head includes a 2D imaging sensor for obtaining images of that target, in a manner analogous to the 3D spatial relationship measurement in the example of FIGS. 7 to 9. At least one active head contains gravity sensors to measure camber and pitch of the head. Since this system obtains a 3D position and orientation measurement between the two active heads, only one active heads is required to have gravity sensors. Again, since the structure, operation and computations are generally similar to those of earlier examples, those skilled in the art should understand the example of FIG. 12 without a more detailed discussion here.

Figure 13:
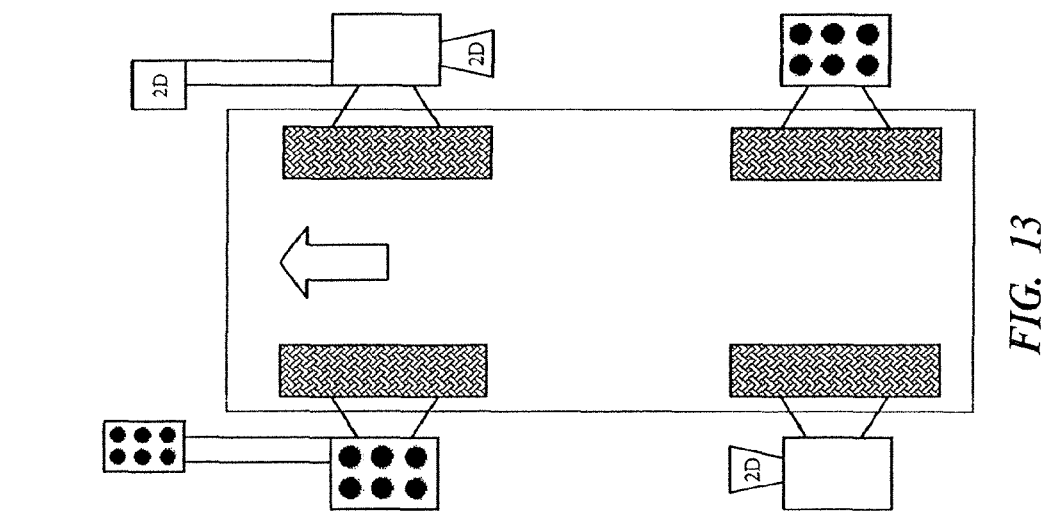

FIG. 13 is yet another alternative arrangement. This example uses a first active sensing head containing a single 2D image sensor for obtaining images of a passive target on a first passive head mounted on the other wheel on the same side of the vehicle. The first passive head is mounted to a wheel on the same side of the vehicle as the first active head. In the specific example shown in the drawing, the first active head is mounted on the left rear wheel, and the first passive head is mounted on the left front wheel. One target on the first passive head is available for imaging by the 2D image sensor associated with the left rear wheel, that is to say, along the vehicle track on that side of the vehicle.

However, the first passive head also contains a second passive target in a known relative position with respect to its first passive target. The second passive target is extended in front of the wheel so that it can be viewed by a corresponding 2D image sensor on the opposite side of the vehicle, for imaging in a spatial relationship measurement. Hence, the second active head is mounted across from the first passive head, that is to say on the right front wheel in the illustrated arrangement. The second active head contains two 2D image sensors. One of these sensors obtains images of the target mounted on the first passive head, attached to the opposite (left front) wheel for the spatial relationship measurement. The other 2D image sensor in the second active head obtains images of the target mounted on a second passive head, which is mounted on the same side of the vehicle, that is to say, on the right rear wheel in this example. The second passive head contains a single target, and that head is mounted across from the first active head.

In the arrangement of FIG. 13, at least one of the active heads contains gravity sensors to measure camber and pitch of the head. Since the system obtains a 3D position and orientation measurement between the two active heads, only one active heads is required to have gravity sensors. In general, the details of implementation and operation of the system of FIG. 13 should be apparent from this summary discussion and the earlier detailed disclosure of the examples of FIGS. 1-9.

Figure 14:
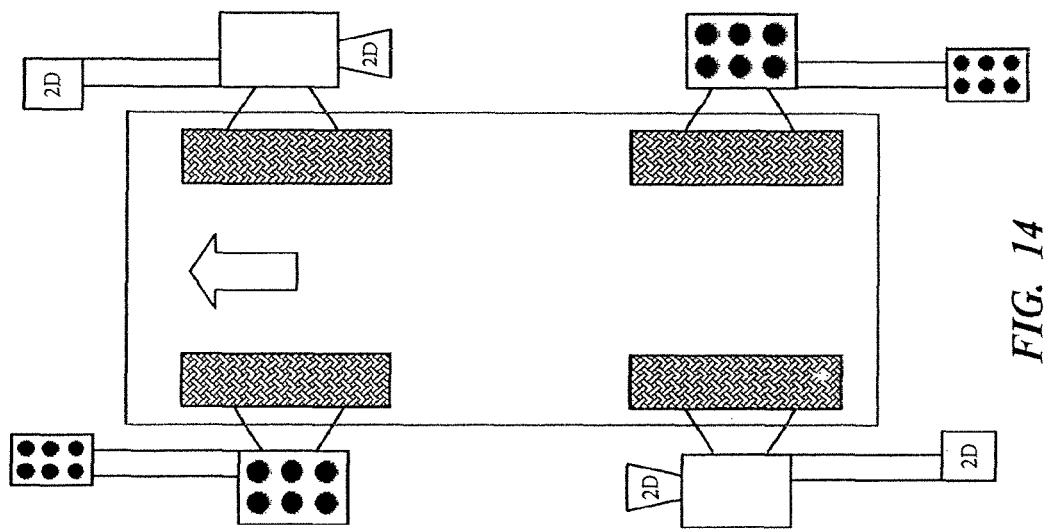

The example illustrated in FIG. 14 is generally, similar to the example of FIG. 13, except that in the system of FIG. 14, the first active head also contains a second image sensor. The second image sensor in that head obtains an image of a second target attached to the second passive head. This configuration has an advantage over the arrangement of FIG. 13 in that it only requires two unique head hardware configurations rather that four. Both active heads are the same, and both passive heads are the same. Each of the active heads would be similar to the head 55' shown in FIGS. 8 and 9. One active head should be identified as a front head and the other as a rear head. This can generally be done with firmware in the embedded processors.

A second advantage of this configuration (FIG. 14) is that the second spatial relationship measurement is redundant information that is not required to calculate wheel alignment. This redundant information can be used as a calibration check on the system. If both active heads contains gravity sensors, both camber and toe can be validated. If only one active head contains gravity sensors, only the toe calibration can be validated.

Figure 15:
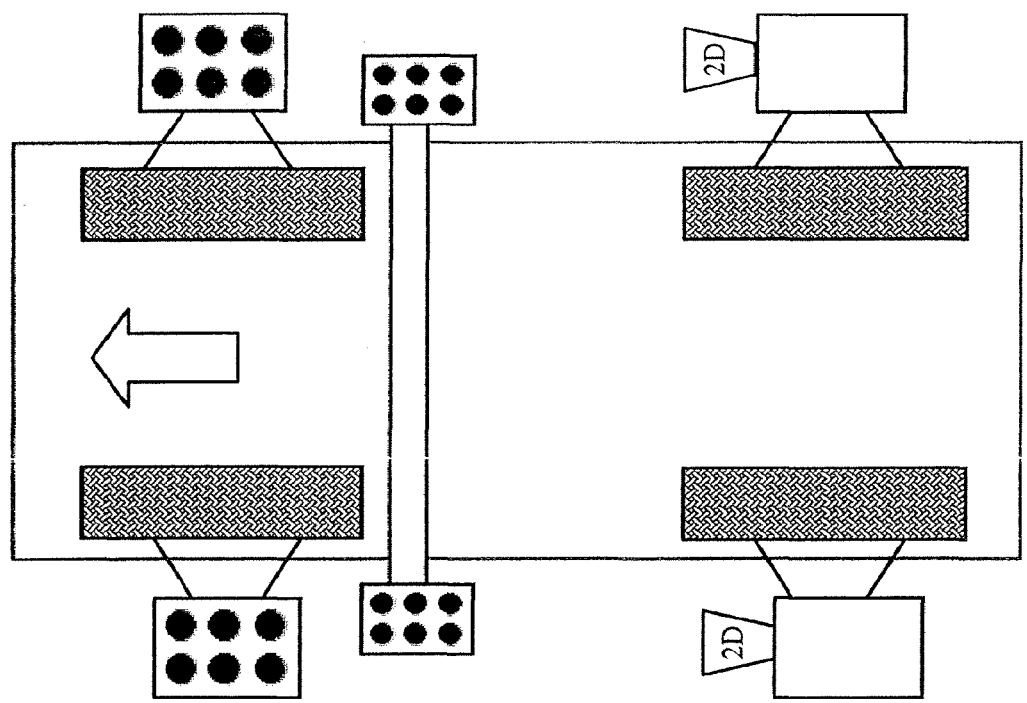

In the example shown in FIG. 15, the system uses passive heads with targets that are mounted on each of the front wheels, essentially as in the examples of FIGS. 1-9. Active heads, shown on the rear wheels, contain 2D image sensors. A reference bar with a target on each end is placed such that each active head can view one of the targets on the reference bar as well as the target on the front wheel of the same side of the vehicle. The relative positions and orientations of the two targets on the reference bar are known. The system can find the spatial relationship of the two active heads from the measured 3D positions and orientations of the two reference targets by the active heads and the known relationship of the two reference targets. This provides the spatial relationship information obtained by the spatial relationship sensor—target of the example of FIGS. 7 to 9. Since the reference targets are fixed in position they can also be used as a reference for measurements during rolling runout. Those skilled in the art should appreciate the detailed structure and operations of this example, from the drawing, this description and the earlier discussion of other similar examples.

Figure 16:
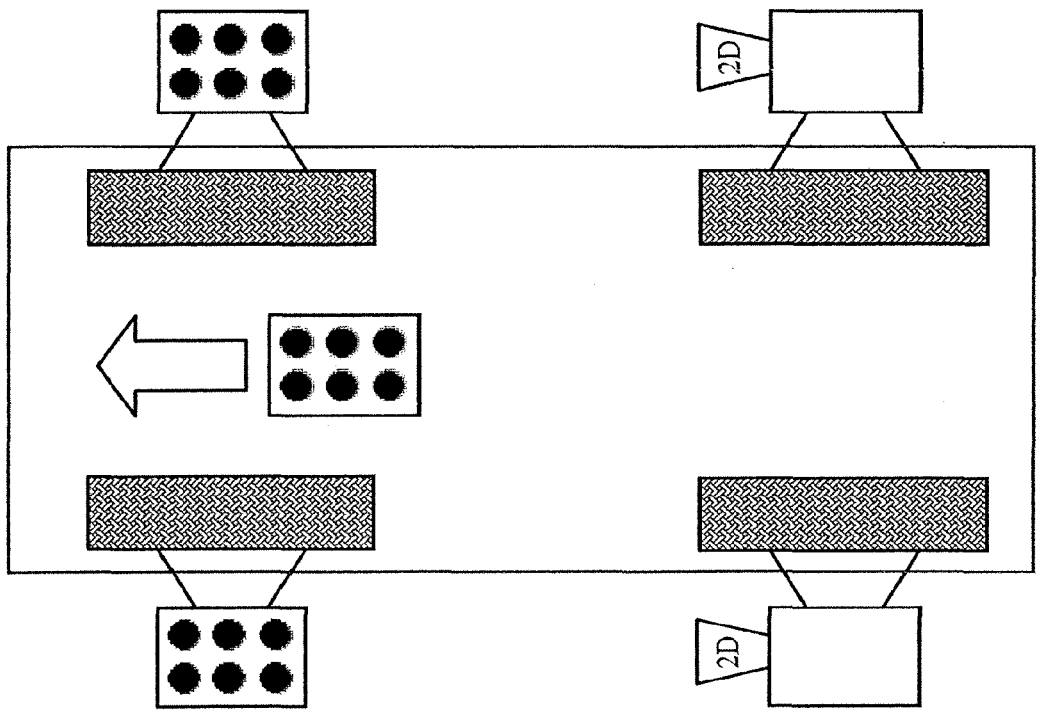

The example illustrated in FIG. 16 generally works just like the example of FIG. 15, except there is only a single reference target. The viewing angle of the image sensors in the active heads must be wide enough to be able to view both the passive head target on the same side of the vehicle and the single reference target.

Figures 17, 18:
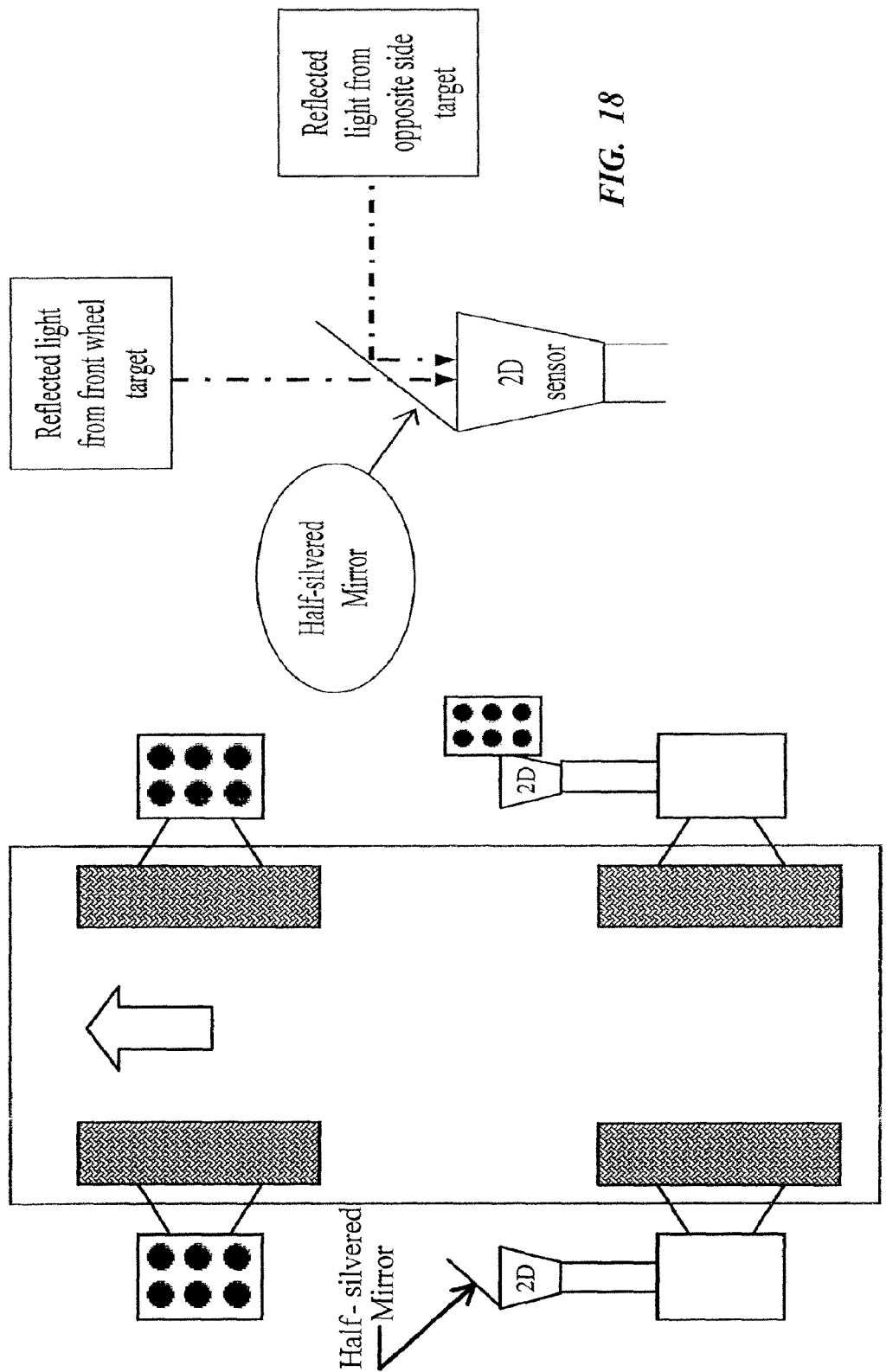

FIG. 17 illustrates yet another example of a hybrid wheel alignment system. Here, the system uses passive heads with attached targets mounted on each front wheel. The active heads are mounted on the rear wheels, as in several of the earlier examples. Each active head contains a 2D image sensor to obtain images of the passive head target on the respective side of the vehicle.

The image sensors are extended forward from the center of the rear wheels so that the sensors are located forward of the rear wheel tires, so as to provide a cross-vehicle line of sight under the vehicle. One of the image sensors, in the example the sensor on the active head mounted on the left rear wheel, contains a partial mirror that passes images from the passive target or reflects images from a target mounted on the corresponding active head on the other side of the vehicle. The operations of the mirror are shown in more detail in FIG. 18.

Light from the passive target on the passive head mounted on the same side of the vehicle, that is to say, on the left front wheel in the illustrated arrangement, passes directly through the half-silvered mirror to the 2D image sensor on the active sensing head mounted on the left rear wheel. Light from the passive target on the opposite active head, that is to say on the active head mounted on the right rear wheel in the illustrated arrangement, arrives at an angle to the partially reflective side of the minor and is reflected into the 2D image sensor on the active sensing head mounted on the left rear wheel. The advantage of this system is that it eliminates one image sensor by allowing one of the sensors to view two different targets.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A wheel alignment system, comprising:
    at least one passive head, comprised of a target, for mounting in association with a wheel of a vehicle for use in measuring an alignment of the wheel by operation of the wheel alignment system; and
    at least one active sensing head comprised of a two dimensional image sensor for producing image data including a representation of a perspective image of target,
    wherein a processor of the active sensing head is configured to receive the image data from the at least one sensing head, and to calculate alignment values indicative of the alignment of the wheel based on the received image data.

2. The system of claim 1, wherein the processor of the active sensing head is further configured to generate a user interface for input or output of alignment information.

3. The system of claim 2, wherein the processor acts as a web server to serve web pages that implement the user interface.

4. The system of claim 3, wherein the processor is configured to act as a web server to serve web pages to a host computer that executes a web browser and does not have wheel alignment specific software installed thereon.

5. The system of claim 2, wherein the active sensing head further comprises a keypad for receiving user input to the active sensing head.

6. The system of claim 1, wherein the active sensing head comprises a data communications interface.

7. The system of claim 6, wherein the data communications interface provides two-way data communication for the components of the active sensing head with a host computer.

8. The system of claim 6, wherein the wheel alignment system comprises a plurality of active sensing heads, and
    the data communications interface provides two-way data communication between the components of the active sensing head and other active sensing heads of the plurality of active sensing heads.

9. The system of claim 6, wherein the data communications interface comprises a Wifi communications interface.

10. The system of claim 6, wherein the data communications interface comprises a Bluetooth communications interface.

11. The system of claim 6, wherein the data communications interface comprises a ZigBee communications interface.

12. The system of claim 6, wherein the data communications interface comprises a broadband communications interface.

13. The of claim 6, wherein the at least one active sensing head is configured to communicate via a network.

14. The system of claim 1, wherein the processor determines a rotational position of the target based on the perspective image of the target produced by the two dimensional image sensor and data corresponding to a true non-perspective image of the target.

15. The system of claim 14, wherein the processor determines the rotational position of the target correlating the perspective image data of the target with the true shape of the target.

* * * * *